K. L. ELSNER.
EXTENSION DEVICE FOR CAR PLATFORMS.
APPLICATION FILED JUNE 13, 1912.
1,045,009.
Patented Nov. 19, 1912.
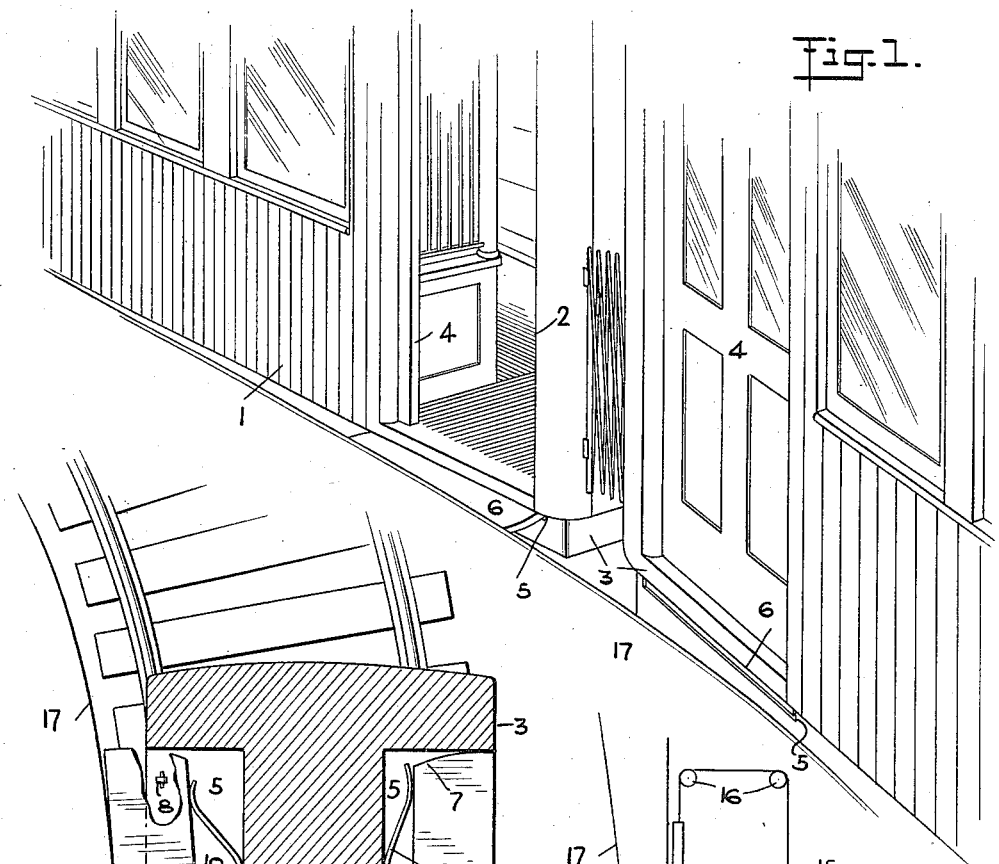
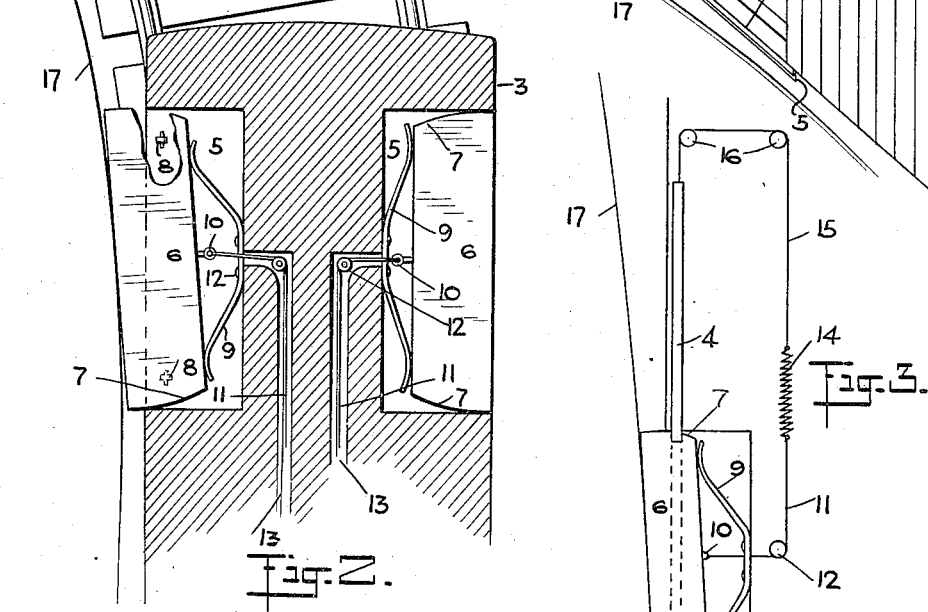
WITNESSES
INVENTOR
Kurt L. Elsner
BY
ATTORNEYS

UNITED STATES PATENT OFFICE.

KURT L. ELSNER, OF NEW YORK, N. Y.

EXTENSION DEVICE FOR CAR-PLATFORMS.

1,045,009.  Specification of Letters Patent.  Patented Nov. 19, 1912.

Application filed June 13, 1912. Serial No. 703,364.

*To all whom it may concern:*

Be it known that I, KURT L. ELSNER, a citizen of the United States, and a resident of the city of New York, borough of Brooklyn, in the county of Kings and State of New York, have invented a new and Improved Extension Device for Car-Platforms, of which the following is a full, clear, and exact description.

My invention comprises an attachment for car platforms and the like which is designed to bridge the space between the side of the car and the edge of the platform at the station for the convenience of passengers leaving the car or boarding the same; and the object thereof is to prevent accidents which might happen in case any of the passengers should inadvertently step into the open space between the edge of the platform at the station and the side of the car and thus sustain injuries.

With this object in view I attach to the ends of the car adjacent the doorway a device which can be connected to move in unison with the door to bridge the space between the car and the platform as soon as the door is opened, and thus eliminate all risk of accident and injury.

Reference is to be had to the accompanying drawings forming a part of this specification, in which the same characters of reference indicate the same parts in all the views.

Figure 1 is a perspective view, showing my invention applied to a car; Fig. 2 is a horizontal sectional view taken through the end of a car at the level of my extension device; and Fig. 3 is a diagrammatic view showing the manner in which my invention is designed to be operated in unison with the car door.

On the drawings the numeral 1 represents a car having a doorway 2 through which passengers enter and leave the car over a platform 3, this doorway 2 being opened and closed by means of a sliding door 4. The platform 3 may be made hollow to form a space 5 below the top of the platform, and in this space 5 is mounted to slide my extension device 6, by means of which the space between the car and the station platform is bridged. This extension device may be arranged on either side of the car in the end platform 3, or wherever else the doors 4 of the sliding or any other type are located; and in order to mount these extension devices 6 in operative position it is not necessary that the platform 3 or the bottom of the car be made hollow, so long as these extension devices 6 are movably mounted so that they can be moved outward laterally of the car for the purpose set forth. For example, I may attach them to the bottom of a car by means of suitable guides by means of which my object could be obtained in the same way as by forming the hollow spaces 5.

Each of the extension devices 6 has its inner corners rounded off as shown at 7, and it is arranged to move upon rollers 8 which engage its lower face. The inner edge of the same is engaged by means of a leaf spring 9 secured at its center to the rear wall of the recess 5, and engaging the inner edge of the extension device 6 at its ends. Secured to each of the devices 6 is a ring or eyelet 10, and to this eyelet is connected an operating cord or chain shown at 11. This operating cord or chain passes over a guide pulley 12, and through a channel 13 to suitable operating devices by means of which the cord or chain 11 is controlled to withdraw the extension device 6 or allow the same to move to projecting position. When the cord for one of the devices 6 is pulled it of course withdraws the device 6 against the force of the spring 9, and when the tension on the chains or cords 13 is relaxed the spring 9 of course moves the extension device 6 outward until it abuts against the edge of the platform and stops bridging the space between the same and the side of the car.

A diagrammatic way in which each bridging or extension device 6 can be connected up to operate in unison with the adjacent door 4, is shown in Fig. 3. Here the operating cord or chain 11 after passing over the guide pulley 12 is joined to a coiled spring 14, to the other end of which is secured a similar cord or chain 15. This cord or chain passes over pulleys 16, and is fastened to the inner edge of the door shown at 4. When the door is moved to closed position, tension is applied to the cords or chains 11 and 15 and the extension device 6 pulled back, the spring 14 stretching to the required extent, owing to the difference in the amount of movement which the door 4 and the device 6 receive. When the door is moved to open position the tension on the cords or chains 11 and 15, as well as the spring 14, is relaxed, allowing the spring 9 to move the bridging device 6 outward. Obviously, the cord or chain 11 may be connected up to the levers by means of which the door 4 is moved opened and shut, as well as being connected to the door itself, as shown.

My invention is of great utility on railways which have one or more stations arranged adjacent parts of the line which are curved, whereby the platform stations shown at 17 must be curved to a corresponding degree. Under such conditions it is inevitable that an open space will be left between the end of each car and the platform at the station, and this space constitutes a source of danger, especially in subways and other places where the full light of day is not available to enable a passenger to see at all times where he is going. The existence of such a space between the car and the station platform might easily be the cause of a broken limb or other injuries in case the passenger leaving or boarding the car should inadvertently step into the space in question or miss his footing and fall into the same. With the use of my invention this danger is entirely eliminated. It will be seen that by connecting each of the devices 6 to be operated in unison with the adjacent door, the moment the door is opened the device 6 moves into position to bridge the space, and thus the danger is eliminated before any one can start to leave the car or board the same.

It will be seen by referring to the drawings, further, that the extension device 6 automatically adjusts itself to the direction of the edge of the platform 17, owing to the fact that the spring 9 engages the rear edge of the device 6 at two points. Hence, no matter how the edge of the platform 17 be curved or inclined, the bridging device 6 will be moved out farther to cover the space where it is widest, and to a less extent at its opposite end.

I wish to have it understood that the above description taken in connection with the drawings is illustrative only, and that I do not care to be limited to the exact arrangement of parts shown and described, but reserve to myself the right to make any changes in the shape, size and manner in which the parts are connected together as fairly fall within the scope and spirit of my claims.

Having thus described my invention, I claim as new and desire to secure by Letters Patent:

1. The combination of a bridging member, means for mounting the same in position to fill a space between a vehicle adjacent an entrance thereto and a platform beside which the vehicle stops, said vehicle having a movable member for closing said entrance, means for actuating the bridging member to cause the same to adjust itself to the outlines of said space when in bridging position, means for causing said bridging member and the member closing the entrance to the vehicle to move in unison, so that the said bridging member may fill said space when the other member opens the entrance, and be withdrawn when the other member closes said entrance.

2. The combination of a bridging member, means for mounting the same in position to fill a space between a vehicle adjacent an entrance thereto and a platform beside which the vehicle stops, said vehicle having a movable member for closing said entrance, resilient means for actuating the bridging member to cause the same to adjust itself to the outlines of said space when in bridging position, and means for causing said bridging member and the member closing the entrance to the vehicle to move in unison, so that the said bridging member may fill said space when the other member closes said entrance.

3. The combination of a bridging member, means for mounting the same upon a vehicle in position to bridge a space between the vehicle adjacent an entrance thereto and a platform beside which the vehicle stops, said vehicle having a member controlling said entrance, means for actuating the bridging member to cause the same to adjust itself to the outline of said space when moved to bridging position, and means for causing said bridging member and the other member to move in unison, so that the bridging member will fill the space when the other member opens said entrance, and be withdrawn when the other member closes the said entrance.

4. The combination of a bridging member, means for mounting the same upon a vehicle in position to bridge a space between the vehicle adjacent an entrance thereto and a platform beside which the vehicle stops, said vehicle having a member controlling said entrance, resilient means for actuating the bridging member to cause the same to adjust itself to the outline of said space when moved to bridging position, and means for causing said bridging member and the other member to move in unison, so that the bridging member will fill the space when the other member opens said entrance, and be withdrawn when the other member closes the said entrance.

5. The combination of a bridging member, means for mounting the same upon a vehicle, said vehicle having a recess beneath an entrance thereto to receive said bridging member, and having a gate for controlling said entrance, means for actuating the member to move the same to fill a space between said vehicle adjacent said entrance and a platform beside which the vehicle stops, and to adjust itself to the outline of said space, and means for causing said member and said gate to move in unison, so that when the gate opens the entrance the bridging member will fill said space, and when the gate closes said entrance the bridging member will be withdrawn from said space.

6. The combination of a bridging member, means for mounting the same upon a vehicle, said vehicle having a recess adjacent an entrance thereto to receive said member, said recess having a gate to control the same, means for actuating the member to cause the same to fill a space between the vehicle adjacent the entrance and a platform beside which the vehicle stops, said means serving to move one end of the bridging member farther from the side of the vehicle than the other end to enable it to adjust itself to the outline of said space, and means for causing the bridging member and the gate to move in unison so that the bridging member will be moved to fill the space when the gate opens the entrance, and withdrawn from said space when the gate closes the entrance.

7. In an improvement of the kind described, a bridging device, means for movably mounting the same beneath the door of a car, a leaf spring having its ends abutting against the inner edge of the bridging device to move the same to projecting position, and means for returning said device against the tension of the spring.

8. In an improvement of the kind described, the combination of a bridging device, means for mounting the same beneath the door of a car, said device having its inner corners cut away, resilient means for moving said device to project outward from the side of the car, anti-friction means supporting said device, and means for withdrawing said bridging device against the tension of said resilient means.

9. The combination of a bridging member adapted to be mounted in a recess in the floor of a car beneath a door thereof, means for moving the bridging member into projecting position, a connection including a yielding member joining the bridging member to the car door, and means for guiding said connection, whereby the car door and the bridging member will be operated in unison.

10. The combination of a bridging member, means for movably mounting the same upon a vehicle adjacent a door controlling entrance thereto, means for causing said device to move with respect to said vehicle to adjust itself to the curvature of a platform beside the roadway on which said vehicle moves, thus bridging the space between the platform and said vehicle, and means for connecting the door to the member, whereby when the door is opened the member can move to bridging position, and when the door is closed the member will be withdrawn.

11. The combination of a bridging member, means for mounting the same upon a vehicle adjacent a door controlling the entrance to said vehicle, means for moving the said member into position to bridge the space between the vehicle and a platform adjacent the roadway along which said vehicle runs, said means engaging the member so as to cause the same to adjust itself to the curvature of the platform, and means connecting said door and said member, whereby the member will be withdrawn when the door is shut, and caused to move into bridging position when the door is opened.

In testimony whereof I have signed my name to this specification in the presence of two subscribing witnesses.

KURT L. ELSNER.

Witnesses:
WM. F. NICKEL,
PHILIP D. ROLLHAUS.

Copies of this patent may be obtained for five cents each, by addressing the "Commissioner of Patents, Washington, D. C."